United States Patent [19]

Perito

[11] Patent Number: 5,340,612
[45] Date of Patent: Aug. 23, 1994

[54] SPRAYABLE PORTLAND CEMENT-BASED FIREPROOFING COMPOSITIONS

[75] Inventor: Richard P. Perito, Malden, Mass.

[73] Assignee: W.R. Grace & Co.-Conn., New York, N.Y.

[21] Appl. No.: 869,605

[22] Filed: Apr. 16, 1992

[51] Int. Cl.$^5$ .......................... B05D 1/02; B05D 7/14; C09D 1/06; C09D 5/18

[52] U.S. Cl. ................. 427/403; 106/15.05; 106/18.11; 106/18.12; 106/735; 106/778; 106/785; 427/427; 427/372.2; 427/397.7

[58] Field of Search ................. 106/15.05, 735, 778, 106/785, 18.11, 18.12; 427/372.2, 427, 397.7, 403

[56] References Cited

U.S. PATENT DOCUMENTS

| | | | |
|---|---|---|---|
| 1,923,370 | 8/1933 | Hansen | 106/735 |
| 3,719,513 | 3/1973 | Bragg et al. | 106/114 |
| 3,839,059 | 10/1974 | Rothfelder et al. | 106/115 |
| 4,054,461 | 10/1977 | Martin | 106/89 |
| 4,069,063 | 1/1978 | Ball | 106/735 |
| 4,159,912 | 7/1979 | Jorgenson | 106/735 |
| 4,751,024 | 6/1988 | Shu et al. | 252/601 |
| 4,904,503 | 2/1990 | Hilton et al. | 427/373 |
| 4,934,596 | 6/1990 | Hilton et al. | 239/8 |
| 4,953,620 | 9/1990 | Bloys et al. | 166/293 |
| 4,989,464 | 2/1991 | Cirignano | 73/865.5 |
| 4,992,103 | 2/1991 | Smart | 106/695 |
| 4,993,884 | 2/1991 | Mueller et al. | 406/49 |

FOREIGN PATENT DOCUMENTS

| | | |
|---|---|---|
| 0060183 | 3/1982 | European Pat. Off. . |
| 0427064 | 10/1990 | European Pat. Off. . |
| 0465991 | 7/1991 | European Pat. Off. . |
| 2264075 | 7/1974 | Fed. Rep. of Germany ...... 106/735 |
| 2528304 | 1/1976 | Fed. Rep. of Germany ...... 106/735 |

OTHER PUBLICATIONS

European Search Report, Application No. EP 93 30 2940, 15 Nov. 1993 (2 pages).

*Primary Examiner*—Anthony Green
*Attorney, Agent, or Firm*—Kevin S. Lemack; William L. Baker

[57] ABSTRACT

Sprayable fireproofing compositions for structural members such as steel columns are provided, as well as a method of applying multiple coatings thereof. The compositions comprise a Portland cement-based material, stucco, and an accelerator. The compositions eliminate the long setting times typical of Portland cement-based materials, and improve the hangability thereof. The product is produced by dry blending a mixture of Portland cement, stucco (calcium sulfate hemi-hydrate) and optionally, a stucco set retarder and shredded polystyrene aggregate. Upon the addition of water, sprayable slurries are formed which can be pumped to the point of application. An accelerator is added in close proximity to the point of injection. Other additives may also be included, such as starch, adhesives and cement strength enhancers. The slurries adhere to the structural member in the slurried state and after setting to provide excellent fire and heat protection. Because of the relative quick setting time of the slurry upon spray application, multiple coatings can be applied within the same working day.

9 Claims, No Drawings

SPRAYABLE PORTLAND CEMENT-BASED FIREPROOFING COMPOSITIONS

FIELD OF THE INVENTION

The present invention relates to sprayable fireproofing compositions.

BACKGROUND OF THE INVENTION

It is well known to spray apply hydraulic cementitious slurries to metal structural members in order to provide a heat resistant coating thereon. U.S. Pat. Nos. 3,719,513 and 3,839,059 disclose gypsum-based formulations which contain, in addition to the gypsum binder, a lightweight inorganic aggregate such as vermiculite, a fibrous substance such as cellulose and an air entraining agent. Such slurries are generally prepared at ground level and are pumped to the point of application, where they are spray applied to the substrate. Often the point of application exceeds 20 or 30 stories where high rise construction is involved. Accordingly, pumpability of the slurries is an important criteria in their formulation and preparation. Thus, they must be able to hold the large quantity of water that renders them capable of being pumped easily and to great heights, yet they must retain a consistency sufficient to prevent segregation or settling of ingredients and permit adequate yield or coverage of the substrate at a given thickness. The coating mixes must adhere to the substrate both in the slurried state and in the dry state. Also, the mix must set without undue expansion or shrinkage which could result in the formation of cracks that would seriously deter from the insulative value of the dry coating.

U.S. Pat. No. 4,751,024, the disclosure of which is incorporated herein by reference, teaches sprayable cementitious compositions containing shredded polystyrene as a lightweight aggregate in fireproofing compositions. The cementitious binder is preferably gypsum, but may instead be Portland cement. Indeed, Portland cement is typically used as the binder in applications involving high traffic areas, since the cement tends to be stronger than gypsum.

However, one problem associated with Portland cement-based fireproofing compositions is the relatively poor hangability (the thickness of material that can be applied in a single application) thereof with respect to gypsum-based compositions, since water tends to segregate in Portland cement mixtures in view of the relatively slow hydration process. In addition, in view of the relatively long time it takes for Portland cement to set, only one spray application can be made per day on a given substrate. Where the thickness of that spray application is insufficient, a second application cannot be made until the first application sets. Premature attempts to coat a second application result in fall off. If multiple applications cannot be made in a typical eight hour work day, labor costs necessarily increase, as does the time in which a job can be completed.

Unlike gypsum-based compositions, which can be easily accelerated with alum, such as in close proximity to the spray nozzle as set forth in U.S. Pat. Nos. 4,904,503 and 4,934,596 (the disclosures of which are herein incorporated by reference), alum does not accelerate Portland cement in sufficient time to allow multiple passes in one day. In addition, sodium aluminate should not be used as an accelerator, in view of the corrosive nature of the sodium aluminate, which causes severe corrosion to the hot rolled steel substrates.

Accordingly, the fireproofing industry has long sought a Portland cement-based sprayable fireproofing material that can be applied to substrates such as steel in multiple applications per day, and that exhibits improved hangability notwithstanding such multiple applications.

SUMMARY OF THE INVENTION

The problems of the prior art have been overcome by the instant invention, which provides a sprayable fireproofing material which eliminates the aforementioned long setting times and improves the hangability of Portland cement-based compositions. In general, the sprayable fireproofing compositions of the instant invention comprise a Portland cement based material that is mixed with water in a conventional paddle mixer and is pumped through various types of equipment. The material is spray applied onto steel beams and columns. The product is produced by dry blending a mixture of Portland cement, stucco (defined herein as calcium sulfate hemi-hydrate), and other additives, such as shredded expanded polystyrene, starch, adhesives and cement strength enhancers. Upon the addition of water, the dry compositions form pumpable, sprayable slurries. Preferably an accelerator is added, most preferably in close proximity to the point of injection.

DETAILED DESCRIPTION OF THE INVENTION

The inventor of the present invention has found that causing a set acceleration of the Portland cement-based fireproofing enables multiple pass applications and improved hangability. That set acceleration can be caused by the addition of stucco, which can be sufficiently retarded to allow pumping and spraying, such as with a retarder, preferably a proteinaceous high strength retarder (commercially available from U.S. Gypsum), in an amount of about 0 to about 1.0% by weight of the composition, preferably about 0 to 0.6%. The amount of retarder may vary, depending upon the particular cement and stucco being used. The acceleration of the set is evidenced by initial quicker stiffening of the Portland cement/stucco matrix. The addition of aluminum sulfate, preferably in close proximity to the point of injection such as in accordance with the method and apparatus disclosed in U.S. Patent No. 4,904,503 or U.S. Pat. No. 4,934,596 increases the speed of the setting process. This quicker set is sufficient to allow a second application of material to be sprayed in a few hours. In particular, when the Portland cement/stucco formulation is injected with alum, the stucco sets, which causes a stiffening of the Portland cement matrix and quickens the increase of the cohesive strength of the composition. Also, the setting of the stucco results in a quicker mechanical attachment to the substrate. This attachment is strong enough to allow a second application within eight hours without fall off. The injection of alum in proximity to the point of injection enables quick setting of the material in a particular spot (i.e., on the substrate rather than in the hopper where the composition is mixed).

The instant fireproofing compositions preferably contain shredded expanded polystyrene as an aggregate. The hangability of the instant composition may depend in part on minimizing the amount of non-shredded expanded polystyrene in the composition. The "shreddedness" of the expanded polystyrene preferably conforms to a particular particle size distribution expressed in terms of the amount of particles retained on a standard #112 sieve (having 0.0661 inch holes), and the amount of particles passing through a standard #30 sieve and retained on a #325 sieve, as determined in accordance with the method described in U.S. Pat. No. 4,989,464 (the disclosure of which is hereby incorporated by reference). Suitable amounts of particles retained on the #12 sieve, expressed as a weight percent, are from about 0 to about 20%, with from about 0 to about 10% being preferred. Suitable amounts of particles passing through a #30 sieve (having 0.0234 inch holes) and retained on a #325 sieve (having 0.0017 inch holes) are less than about 40% by weight, preferably less than about 30 %.

Since the instant fireproofing compositions are typically transported to the building site as dry mixtures, and are formed into slurries upon the addition of an appropriate amount of water, the preparation and application processes may span many hours and thus the setting time of the mix is generally heavily retarded to provide an acceptable field pot life. This retarding in the mixer contradicts the desired quick setting time upon spray application, and thus a delicate balance of retarding and accelerating is difficult to achieve. Obviously, were the mixture to stiffen substantially in the hopper, it would be rendered non-pumpable and therefore would be useless for the intended application. By adding retarder to the stucco, the retarded material does not stiffen as quickly in the mixer, and the retarder does not have any significant effect on the quick stiffening at the nozzle. For these reasons, the addition of retarder is preferred.

Any set accelerating agent capable of satisfactorily offsetting the retardation of the slurry without deleteriously effecting the slurry or the substrate which is the subject of the application can be used. Preferably the accelerator is used in an amount sufficient to sufficiently set the slurry within 1.5 hours of spray application to allow for a second spray application without fall off. The particular amount required will depend upon the type of accelerator, as well as the nature of the various other components of the fireproofing composition. Examples of useful accelerators include aluminum sulfate, aluminum nitrate, ferric nitrate, ferric sulfate, potassium sulfate, sulfuric acid, sodium carbonate, sodium bicarbonate and acetic acid, with alum being especially preferred.

The present invention is applicable to Portland cement types 1 through 5, although types 1 is especially preferred. The dry mix has a bulk density in the 10 to 18 pcf range, preferably in the 12 to 15 pcf range, and the final dry density of the product is in the 15 to 30 pcf range, preferably the 22 to 26 pcf range. The dry material is mixed with water at a ratio of 1.3:1 –1.6:1 (water:-solids). A suitable product can be produced in accordance with the invention by dry blending a mixture of the following:

| Portland cement | 50–90% |
| Stucco | 4–30% |
| Retarder | 0–1% |
| Shredded polystyrene | 0–5%, preferably 2–3% |
| Clay | 2–8% |
| Cellulose (aggregate) | 0–8% |
| Air entrainment | 0.2–2% |
| Glass fibers | 0–4% |

-continued

| methyl cellulose | 0–1% |

A preferred product includes the following range of ingredients:

| Portland cement | 67–74% |
| Stucco | 12–18% |
| Retarder | 0–0.6% |
| Shredded polystyrene | 2.5–3%, |
| Clay (thickener) | 2–6% |
| Cellulose | 2–6% |
| Air entrainment | 0.2–0.5% |
| Glass fibers | 1.5–3% |
| methyl cellulose | 0.2–0.5% |
| biocide (Amical/wp sold by Angus Chemical) | 0.02%, or an amount sufficient to prevent deleterious formation of bacteria |

Preferably the aluminum sulfate set accelerator is used as a 37 % solution and is injected into the slurry at the spray nozzle at a level up to 3%.

Additional optional ingredients may be added, such as glass fibers to control shrinkage, methyl cellulose or other suitable thickeners known to those skilled in the art, air entraining agents such as sodium lauryl sulfate, and a biocide to inhibit bacterial formation.

In employing the fireproofing compositions in accordance with the present invention, a second application can be spray applied within about 1 to 2 hours, preferably within about 1.5 hours of the first application without fall off. Improved hangability also resulted; a single application typically could be spray applied to a thickness of about 3/4 - 1 inch, and was in fact spray applied to a thickness of as much as 1.5 inches, whereas conventional Portland cement-based compositions typically could be hung to thicknesses of only 1/2 to 5/8 inches.

EXAMPLE 1

The following formulations were prepared:

| For-mulation | % Stucco | % Cement | Dry Bulk Density | Nozl. Vicat (MM) @ 1 Hr Uninjected | Injected |
|---|---|---|---|---|---|
| Control | 0 | 85.7 | 12.4 | 14.5 | 11.5 |
| 1 | 8 | 77.5 | 11.8 | 12 | 9.5 |
| 2 | 12 | 73.4 | 12.6 | 11 | 8.5 |
| 3 | 16 | 69.3 | 13.2 | 9.5 | 6.5 |
| 4 | 24 | 61.2 | 12.3 | 10.5 | 8 |

The cement in each of the above batches was type 1 Portland cement. Each batch was spray applied to a steel structural member, with 2.6% alum added in accordance with the teachings of U.S. Pat. No. 4,904,503. The 12% and 16% batches set sufficiently within 1 to 1.5 hours so that a second application could be applied. The 12% and 16% first application had a thickness of ⅜" to ⅞", with a total average thickness after the second application up to 1.5–2". With regard to the control, the first application amounted to a coating of up to 5/8 of an inch. A second pass (amounting to a total coating thickness of 1.5 inches) was attempted after 1.5 hours, but fall off was encountered. In particular, the application of a second pass caused fall off of not only the second application, but also some of the coating from a first application. This suggests that the coating of the first application did not sufficiently bond to the substrate within the 1.5 hour time period.

The vicat data is a measurement of the flow and stiffness of the material. The stiffness is generally an indication of how well the product hangs. The lower the vicat reading, the stiffer the product. Preferably the vicat number is below about 10 mm, most preferably the reading is about 8 mm or less. Although the vicat reading of formulation number 4 in Example 1 seems excellent, in fact that formulation, containing 24% stucco, proved to be too stiff in the hopper; that is, the workability was poor. In order to render such a formulation commercially viable, additional water would have been necessary, thereby increasing the final vicar number of the useable composition.

What is claimed is:

1. A portland cement-based sprayable fireproofing composition, comprising a dry blend of 50-90% portland cement and 4-30% stucco, said dry blend having a bulk density ranging from 10 to 18 pcf, and up to 3% of an accelerator for said composition.

2. The sprayable fireproofing composition of claim 1, further comprising a stucco set retarder.

3. The sprayable fireproofing composition of claim 1, further comprising shredded polystyrene.

4. A method of applying multiple coatings of a sprayable fireproofing composition to a steel substrate comprising dry blending a mixture comprising 50-90% Portland cement and 4-30% stucco; adding water thereto to form a sprayable slurry; conveying said slurry to a spray nozzle; introducing a set accelerating agent into said slurry before, during or after said conveyance; in close proximity to said nozzle; spraying a first coat of said slurry onto said substrate; allowing said first coat to set sufficiently to hold a second coat; and spraying a second coat of said slurry thereon within eight hours of spraying said first coat.

5. The method of claim 4, wherein said dry blending step further comprises adding a stucco retarder to said mixture.

6. The method of claim 5 wherein said stucco, retarder and set accelerating agent are provided in an amount sufficient to allow said slurry, upon application to said substrate, to set within 1.5 hours.

7. The method of claim 4 wherein said first coat of said slurry is spray applied to a thickness exceeding 5/8 inches.

8. The method of claim herein the average total thickness of said first and second coats of said slurry is about 1.5 to 2 inches.

9. The method of claim 4, where said dry blending step further comprises adding shredded polystyrene to said mixture.

* * * * *